United States Patent
Hull

[15] 3,699,144
[45] Oct. 17, 1972

[54] AROMATIC POLYSULFITES
[72] Inventor: Colin G. Hull, San Francisco, Calif.
[73] Assignee: Shell Oil Company, New York, N.Y.
[22] Filed: Sept. 19, 1969
[21] Appl. No.: 859,557

[52] U.S. Cl. ................................260/456 P, 260/49
[51] Int. Cl. .............................................C07c 143/68
[58] Field of Search........................260/456 R, 456 P

[56] References Cited

UNITED STATES PATENTS 2,624,750  1/1953  Pechukas............260/456 R X

OTHER PUBLICATIONS

Chemical Abstracts 56: 5869e (1962).

Primary Examiner—Leon Zitver
Assistant Examiner—Leo R. De Crescente
Attorney—Joseph W. Brown and Martin A. Voet

[57] ABSTRACT

The disclosure describes novel compounds, the bis-chlorosulfinate of di-(monohydroxyaryl)alkanes, and a novel method for producing aromatic polysulfites from said bis-chlorosulfinates by heating the bis-chlorosulfinate under reduced pressure whereby the bis-chlorosulfinate undergoes self-polymerization to form an aromatic polysulfite.

4 Claims, No Drawings

AROMATIC POLYSULFITES

The present invention relates to novel compounds and a novel process for preparing polymers from the new compounds.

Aromatic polysulfites, useful in the preparation of plastics and in the pre-treatment of glass fibers which are embedded in polyester resins have been prepared by reacting a di-(monohydroxyaryl)alkane with a sulfite in the presence of basic catalysts at elevated temperatures and reduced pressure, e.g., see German Patent No. 1,213,612. The present invention relates to novel compounds, namely the bis-chlorosulfinates of di-(Monohydroxyaryl)alkanes and a novel method for producing aromatic polysulfites from said bis-chlorosulfinates.

The present invention thus comprises compounds of the formula

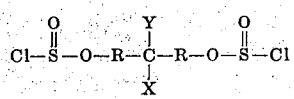

wherein each R is selected from the group consisting of phenylene, halo-substituted phenylene and alkyl-substituted phenylene radicals, and X and Y are each selected from the group consisting of hydrogen, hydrocarbon radicals free from aliphatic unsaturation and of radicals which together and with the adjoining carbon atom form a cycloalkane radical, the total number of carbon atoms in X and Y being up to 12.

The present invention also relates to a method of producing aromatic polysulfites comprising heating under reduced pressure a compound having the formula

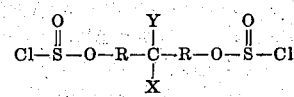

wherein each R is selected from the group consisting of phenylene, halo-substituted phenylene and alkyl-substituted phenylene radicals and X and Y are each selected from the group consisting of hydrogen, hydrocarbon radicals free from aliphatic unsaturation and of radicals which together and with the adjoining carbon atom form a cycloalkane radical, the total number of carbon atoms in X and Y being up to 12 whereby the compound undergoes self-polymerization to form an aromatic polysulfite.

The process for producing the new compounds comprises reacting the di-(monohydroxyaryl)alkanes with thionyl chloride in a suitable solvent under an inert gas at low temperatures. Suitable solvents are those solvents which are non-reactive with thionyl chloride, such as hydrocarbon solvents, halo-substituted hydrocarbon solvents, ether solvents and aromatic solvents. Specific solvents which are suitable are, for example, diethyl ether, dichloromethane, cyclohexane, tetrahydrofuran and carbon tetrachloride. By low temperatures are meant temperatures in the range of about 0° to 10° C and preferably about 5° C. The reaction proceeds well at atmospheric pressure but may be carried out under pressure if desired. The resulting new compounds may be recovered by simply removing the solvent by any convenient means, such as, for example, evaporation. Since the resulting compounds hydrolyze relatively easily, care must be taken in storage of the material.

Once the bis-chlorosulfinate is made, aromatic polysulfites may be produced by simply heating the bis-chlorosulfinate at moderate temperatures. By moderate temperatures is meant above about 125° C and preferably between about 140° and 160 C. While the reaction may be run at atmospheric pressure, a somewhat reduced pressure facilitates the reaction.

Suitable di-(monohydroxyaryl)alkanes are for example (4,4'-dihydroxydiphenyl)methane, 2,2-(4,4'-dihydroxy-diphenyl)propane (Bisphenol A), 1,1-(4,4'-dihydroxy-diphenyl)chlohexane, 1,1-(4,4'-dihydroxy-3,3'-dimethyldiphenyl)butane, (boiling point: 185-188°C under 0.5 mm mercury gauge) 2,2-(2,2'-dihydroxy-4,4'-di-tert-butyl-diphenyl)propane or 1,1'-(4,4'-dihydroxydiphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)butane, 2,2-(4,4'-dihydroxy-diphenyl)pentane (melting point 149–150°C), 3,3-(4,4'-dihydroxy-diphenyl)pentane, 2,2-(4,4'-dihydroxydiphenyl)hexane, 3,3-(4,4'-dihydroxy-diphenyl)hexane, 2,2-(4,4'-dihydroxydiphenyl)-4-methyl-pentane (melting point 151-152°C), 2,2-(4,4'-dihydroxydiphenyl)heptane (boiling point 198-200°C under 0.3mm mercury gauge), (4,4'-dihydroxy-diphenyl)heptane (melting point 148-149°C), or 2,2-(4,4'-dihydroxydiphenyl)-tridecane. Suitable di-(monohydroxyaryl)alkanes, the two aryl residues of which are different, are for example 2,2-(4,4'-dihydroxy-3'methyl-diphenyl)propane and 2,2-(4,4'-dihydroxy-3-methyl-3'-isopropyldiphenyl)butane. Suitable di-(monohydroxyaryl)alkanes, the aryl residues of which carry halogen atoms, are for instance 2,2-(3,5,3',5'-tetra-chloro-4,4'-dihydorxy-diphenyl)propane, 2,2-(3,5,3', 5'-tetrabromo-4,4'-dihydroxy-diphenyl) propane, (3,3'-dichloro-4,4'-dihydroxy-diphenyl)methane and 2,2'-dihydroxy-5,5'-difluoro-diphenyl-methane. Suitable di-(monohydroxyaryl)alkanes, the alkyl residue of which linking the two benzene rings is substituted by an aryl residue, are for instance (4,4'-dihydroxy-diphenyl)phenyl-methane and 1,1-(4,4'-dihydroxy-diphenyl)-1-phenyl-ethane.

EXAMPLES

The following examples illustrate particular embodiments of the present invention, including the preferred embodiments. The invention is not to be interpreted as being limited by the illustrative examples, which are presented only to facilitate a better understanding thereof. Unless otherwise specified, "parts" is parts by weight.

EXAMPLE I

Preparation of the bis-chlorosulfinate of Bisphenol A

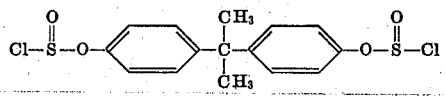

57.1 parts (0.25mol) of Bisphenol A [2,2-bis(4-hydroxyphenyl)propane] was dissolved in 100 parts by volume of diethyl ether. 120 parts of thionyl chloride and 20 ml of diethyl ether were placed in a reaction flask and cooled to 5°C in an ice/salt bath. The Bisphenol A/diethyl ether solution was then added over 40 minutes with stirring under $CO_2$. The cooling bath was removed allowing the reaction product to come to room temperature. 85.3 parts of a straw colored viscous liquid was recovered. The following tests indicated that the recovered material was the bis-chlorosulfinate of Bisphenol A.

Chemical analysis of the recovered compound compared to the formula of the bis-chlorosulfinate of Bisphenol A was as follows:

|   | Analysis of $C_{15}H_{14}S_2Cl_2O_4$ (%) | Analysis of Recovered Compound (%) |
|---|---|---|
| C | 45.8 | 48.3 |
| H | 3.6 | 3.9 |
| S | 16.3 | 14.8 |
| Cl | 18.0 | 17.1 |

Infrared Spectra taken of the recovered compound showed wavelengths of S=O at 1,230cm⁻1. In addition, no trace of O—H stretch was found indicating that the compound contained no free Bisphenol A.

Additionally, 5.2608g of the compound was hydrolyzed and yielded 2.9977g Bisphenol A (Theoretical Bisphenol A is 3.0531g) The reaction was as follows:

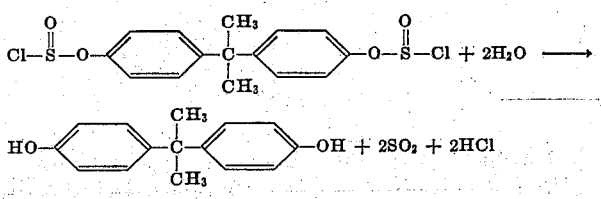

EXAMPLE II

Example I is repeated except that 1,1-(4,4-dihydroxy-diphenyl)-cyclohexane is used in place of Bisphenol A. Related results are obtained.

EXAMPLE III

Example I is repeated except that 2,2-(4,4'-dihydorxy-3'-methyldiphenyl)propane is used in place of Bisphenol A. Related results are obtained.

EXAMPLE IV

Example I is repeated except that 2,2-(4,4'-dihydroxy-diphenyl)-butane is used in place of Bisphenol A. Related results are obtained.

EXAMPLE V

Preparation of Bisphenol A polysulfite

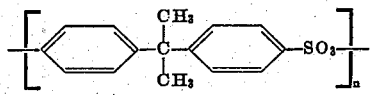

10 parts of the bis-chlorosulfinate of Bisphenol A produced in Example I was placed in a 50 ml 2-neck flask. The flask was slowly heated in an oil bath to 155°C under reduced pressure with stirring and held at the temperature for several hours. Thionyl chloride was found to be released during the reaction. The reaction product was worked up in a high shear blender with methanol to yield a tan, fluffy polymer. Chemical analysis of the polymer indicated that it was the polysulfite of Bisphenol A (as indicated at Table I). The polymer had a molecular weight between about 1,000 and 2000 and thus n was between about 4 and 6.

TABLE I
ANALYSIS OF POLYMER RECOVERED IN EXAMPLE V

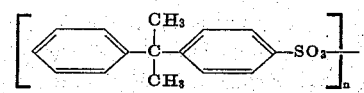

|   | Actually Found (%) | Theory (%) |
|---|---|---|
| C | 64.0 | 65.6 |
| H | 5.2 | 5.1 |
| S | 9.6 | 11.7 |
| Cl | 2.5 | 0.0 |

I claim as my invention:

1. A process for producing aromatic polysulfites comprising heating under reduced pressure and at a temperature above about 125°C a compound having the formula

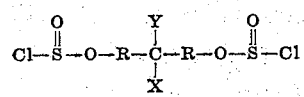

wherein each R is selected from group consisting of phenylene, halo-substituted phenylene and alkyl-substituted phenylene radicals, wherein the alkyl groups contain up to three carbon atoms and X and Y are each selected from the group consisting of hydrogen, alkyl radicals, aryl radicals, and of radicals which together and with the adjoining carbon atom form a cycloalkane radical, the total number of carbon atoms in X and Y being up to 12, whereby the compound undergoes self-polymerization.

2. A process for producing aromatic polysulfites comprising heating under reduced pressure and at a temperature above about 125°C a compound having the formula

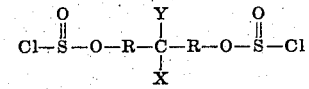

wherein each R is phenylene and and Y are each alkyl radicals, the total number of carbon atoms in X and Y being up to six, whereby the compound undergoes self-polymerization.

3. A process for producing the polysulfite of Bisphenol A comprising heating under reduced pressure and at a temperature above about 125°C the bis chlorosulfinate of Bisphenol A.

4. A process as in claim 2 wherein the temperature during heating ranges between about 135 and 170°C.

* * * * *